United States Patent [19]

Smith

[11] 3,857,475

[45] Dec. 31, 1974

[54] FEEDING APPARATUS FOR ELONGATED MASSES OF MATERIAL

[75] Inventor: Robert Lewis Smith, Hinsdale, Ill.

[73] Assignee: Chemetron Corporation, Chicago, Ill.

[22] Filed: Sept. 28, 1972

[21] Appl. No.: 293,166

[52] U.S. Cl. ............................... 198/137, 198/165
[51] Int. Cl. ............................................. B65g 15/00
[58] Field of Search ........... 198/162, 165, 160, 137, 198/204, 202

[56] References Cited
UNITED STATES PATENTS

| | | | |
|---|---|---|---|
| 1,917,659 | 7/1933 | Marshall | 198/165 |
| 2,679,313 | 5/1954 | Gueffroy et al. | 198/165 |
| 2,825,442 | 3/1958 | Carter | 198/165 |
| 2,875,890 | 3/1959 | Good | 198/165 |
| 2,907,447 | 10/1959 | Offutt et al. | 198/165 |
| 3,516,312 | 6/1970 | Nordberg et al. | 83/580 |

Primary Examiner—Evon C. Blunk
Assistant Examiner—Joseph E. Valenza
Attorney, Agent, or Firm—Mason, Kolehmainen, Rathburn & Wyss

[57] ABSTRACT

Apparatus for feeding an elongated loaf or similar mass of substantially uniform transverse dimension along a feed path intersecting the cutting path of a rotary knife comprises a pair of spaced apart endless belts having driving runs disposed on opposite sides of the feed path for driving engagement with a load being fed, a pair of undulated surfaces positioned to hold the driving runs of the belts in driving engagement with the loaf being fed along the feed path, and means for moving the belts along the driving runs in a common direction. As disclosed, each belt is provided with multiple cleats on opposite sides, the cleats on one side of each belt being arranged to grip a loaf being fed and the cleats on the other side of each belt being drivingly engaged with a toothed drive roll driving the belt.

2 Claims, 4 Drawing Figures

FEEDING APPARATUS FOR ELONGATED MASSES OF MATERIAL

The present invention pertains to new and improved apparatus for feeding elongated loaves or similar masses of food product, such as luncheon meat, processed cheese, and the like, which must be fed into the cutting path of a rotary knife to cause a plurality of successive slices to be cut from the loaves. Such loaves often are 4 to 6 feet long and 4 to 6 inches in transverse dimension.

The present invention is addressed to certain improvements in feeding apparatus generally of the type shown in U.S. Pat. No. 3,605,837, comprising a pair of spaced apart endless belts.

It is, therefore, an object of this invention to provide new and improved feeding apparatus for feeding elongated loaves or similar masses of food product into the cutting path of a rotary knife.

Another object of this invention is to provide new and improved feeding apparatus of the type comprising a pair of spaced apart endless belts arranged to feed such an elongated loaf into the cutting path of a rotary knife.

Another object of this invention is to provide new and improved feeding apparatus of the type mentioned above for feeding such an elongated loaf in a manner eliminating any slippage between the loaf and the belts.

Another object of this invention is to provide new and improved apparatus, of the type mentioned above, wherein a pair of undulated surfaces are positioned to hole the driving runs of the belts in driving engagement with a loaf being fed along the feed path.

Another object of this invention is to provide new and improved apparatus, of the type mentioned above, wherein the belts are arranged to move such an elongated loaf along a serpentine feed path defined by a pair of undulated surfaces backing the driving runs of the belts.

Furthermore, another object of this invention is to provide new and improved apparatus, of the type mentioned above, wherein each belt is provided with multiple cleats on opposite sides, the cleats on one side of each belt being arranged to grip a loaf being fed and the cleats on the other side of each belt being engaged with a toothed drive roll driving the belt.

These and other objects of the present invention should be evident from the following description with the aid of the accompanying drawings, of a preferred embodiment of this invention.

FIGS. 1 through 4 of the drawings illustrate a feeder 34 constructed according to the present invention and combined with other components of a slicing system disclosed in the copending United States patent application, Ser. No. 293045, filed Sept. 28, 1972, which is assigned to the assignee of the present invention. As described in said copending application, the system includes a loader (not shown) for receiving elongated masses or loaves 32 of food product or the like and elevating, orienting and feeding the loaves in end-to-end relation onto a downward feed path toward the feeder 34. The feeder is adapted to feed the loaves at a selected feed rate into the cutting path of a rotating knife 36. The knife is carried on a shaft 38 generally parallel to the feed path of the loaves and is driven by a variable speed motor (not shown) to vary the thickness of the slices to produce stacks or groups meeting a minimum weight requirement for a selected number of slices in a package. Further details of the knife motor and associated components are found in the aforesaid copending application.

Figure 2:
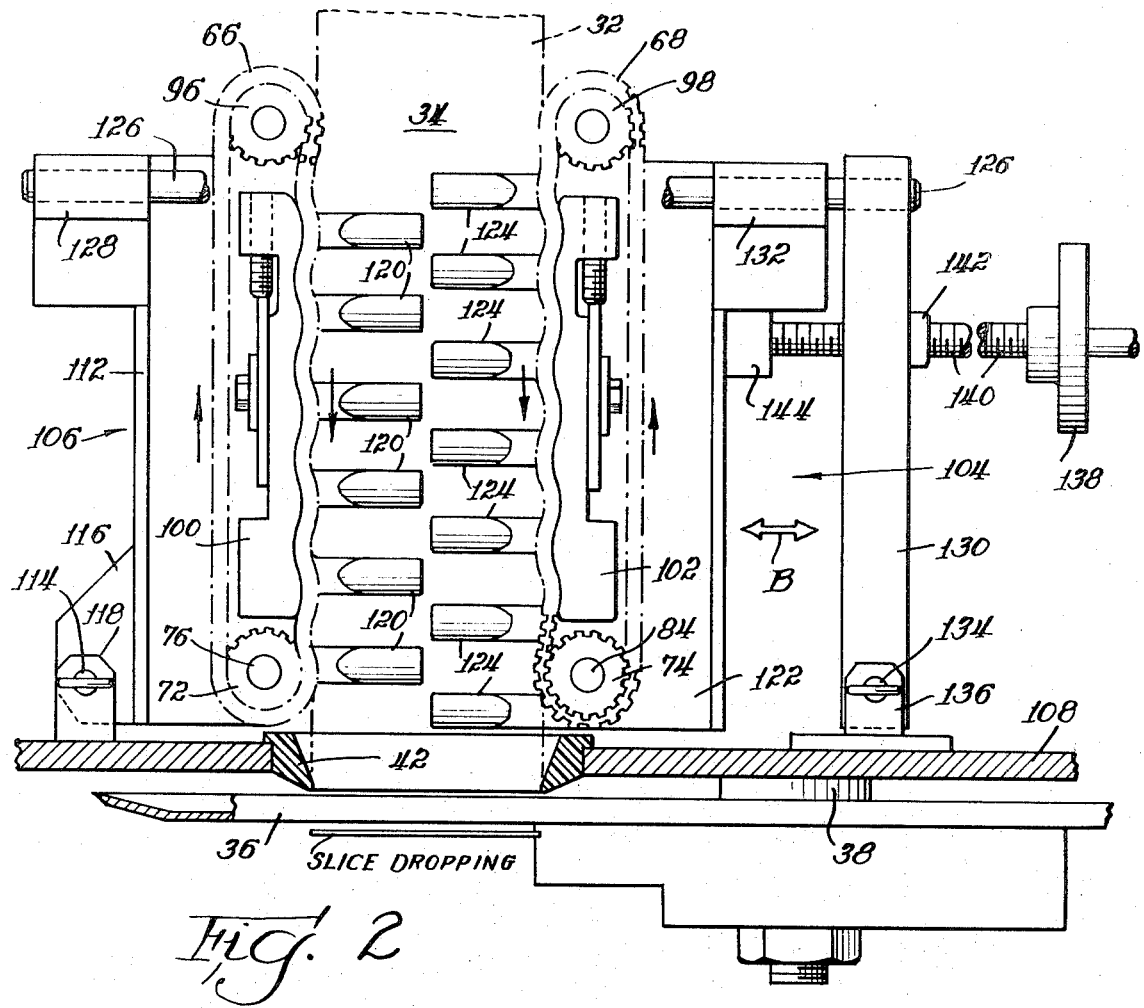
FIG. 2 is an elevational view of the subject matter shown in FIG. 1.

As shown in FIG. 2, the cutting path of the rotating knife 36 beneath the top wall 108 of the knife housing is in shearing relation with the margin or lower edge of a restrictive orifice defining ring 42 positioned at the lower or discharge end of the feeder 34. The feeder 34 guides the loaves through the restricted orifice opening which compresses and holds the product as the slices are cut therefrom. As the slices are cut by the knife they fall onto a stacker or stacking mechanism (not shown) for accumulation and separation into groups or stacks. Further details of the stacking mechanism are found in the aforesaid copending application.

The elongated loaves of product to be sliced are of a substantially uniform cross-section throughout their length except possibly for the ends of the loaves which may be rounded in a sort of bullet shape. Such loaves 32 are normally brought at random time intervals by trucks or the like to the loader and are directed by the loader along a vertical feed path into the upper end of the feeder 34. If it is desired or necessary the bullet shaped ends of the loaves may have been chopped off or cropped in the loader as by a pair of rotating knives. Details of the loader are set forth in the copending United States patent application Ser. No. 293145, filed Sept. 28, 1972, and assigned to the assignee of the present application.

Figure 3:
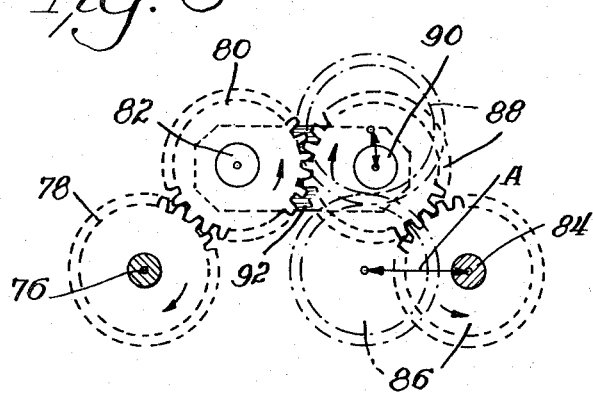
FIG. 3 is a sectional view taken generally along line 3—3 of FIG. 1.
Figure 4:
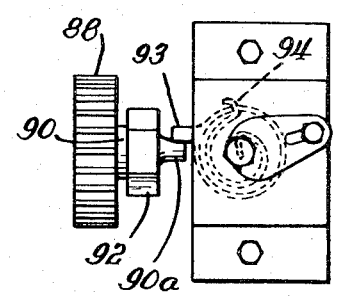
FIG. 4 is a sectional view taken generally along line 4—4 of FIG. 1.

The loaves 32 are directed by the feeder 34 into the slicer along a downward feed path through the restricted orifice opening in the orifice ring 42. The feed path intersects the cutting plane of the rotating knife 36 below the top wall 108 of the knife housing. The feeder 34 includes a pair of cleated, endless belts 66 and 68 driven at a selected speed by a reversible, feeder-retractor motor 70. The belts 66 and 68 are cleated on both sides and are driven by a pair of lower drive rolls 72 and 74 having cleat engaging ridges and grooves thereon for positively synchronizing the feed speed of the belts to produce a substantially constant rate of feed into the cutting path. The drive roll 72 is mounted on a shaft 76 having a toothed gear 78 on one end, which gear is in driven engagement with a main drive gear 80 (FIG. 3). The drive gear 80 is carried on a shaft 82 coupled to the output shaft of the motor 70. The cleated belt 66 is movable along a fixed, downwardly extending belt run and the opposite belt 68 is adjustable laterally toward and away from the belt run to accommodate different cross-sectional shapes and sizes of loaves that are handled by the feeder. The drive roll 74 of the cleated belt 68 is mounted on a shaft 84 having a gear 86 on one end thereof and this gear is in driving engagement with an idler gear 88 mounted on an idler shaft 90. The shaft 90 is linked with the shaft 82 by a pivot link 92 and, as best shown in FIG. 3, as adjustments in the lateral spacing between the endless drive belts 66 and 68 are made, the gear 86 is moved toward and away from the gear 78 (as indicated by the arrow "A") while in continuous synchronous driven engagement therewith through the main driven gear 86 and the idler gear 88. In order to insure that the idler gear 88 is continuously biased into driving engagement between the gears 80 and 86, the shaft 90 includes a flatted end portion 90a which is urged downwardly by a finger 93 biased downwardly by a coil spring 94 (FIG. 4).

The upper ends of the belts are supported by idler rolls 96 and 98 respectively and each belt has an inside, downward run opposite and facing the other for positive driving engagement on opposite sides of the loaves 32. As best shown in FIG. 2 the belt 66 is provided with a backing guide member 100 having a belt engaging surface formed with alternate ridges and grooves thereon providing an undulated guide path for the driving run of the belt. The belt 68 has a similar backing guide member 102 with an undulated guide surface and the ridges on one guide member are disposed opposite the grooves on the opposite guide so that a serpentine path is defined between the guides 100 and 102 by the driving runs of the belts 66 and 68. The serpentine path provided by the drive runs of the belts 66 and 68 provides for positive gripping and feeding of the loaves into the slicer 37 and a substantially constant downward feed rate is maintained with very little if any slippage. The belt backing guides 100 and 102 insure that each loaf passing through the feeder 34 is positively fed along a precise feed path into the cutting path of the knive 36 at a substantially constant selected feed rate.

In order to accommodate loaves 32 having various different cross sections and transverse dimensions, the belt 68 and backing structure 102 are supported on a support 104 movable toward and away from the run of the belt 66 which is relatively fixed and supported from a structure 106. Both belt support structures extend upwardly from the top wall 108 of the knife housing and are offset from the axis of rotation of the knife. The support 106 for the belt 66 includes an upright guide 112 of generally Z-shaped transverse cross-section (FIG. 1) and the lower end of this structure is attached to the housing wall 108 by a pair of pivot pins 114 having pull rings in the end for extracting the pins so that the feeder 34 may be disconnected from the knife housing 110 for cleaning or maintenance if required. The pins 114 normally extend through aligned apertures in a pair of brackets 116 secured to the guide structure 112 and a pair of upstanding brackets 118 mounted on the top wall 108 of the knife housing.

As best shown in FIG. 2, the guide 112 is formed with a plurality of spaced apart, horizontal fingers 120 along one flange thereof, said fingers projecting outwardly of the face of the driving run of the belt 66 for engaging and laterally guiding a transverse side of a loaf 32 fed down the feed path into the orifice ring 42. The support 104 for the belt 68 includes a similar guide 122 of generally Z-shaped transverse cross-section (FIG. 1) and this guide has a plurality of spaced apart, horizontal fingers 124 along one flange adapted to extend into the slots and mesh between the fingers 120 of the guide 106 when the spacing interval between the belts 66 and 68 is reduced to accommodate relatively thin loaves of food product. Pairs of guide fingers 120 and 124 thus cooperate to provide a transverse guiding surface that is adjustable in width and generally transverse to paths of the driving runs of the endless belts 66 and 68.

The guide structure 122, endless belt 68 and backing member 102 are supported for movement toward and away from the belt 66 from a pair of parallel horizontal rods 126 disposed outwardly of opposite edges of the belts 66 and 68. The support rods extend between sleeves 128 mounted adjacent the upper end of the upright 112 and mounting apertures provided in the upper end of an upright support 130 spaced outwardly of the belt 68. The drive shafts 76 and 84 for the drive rolls 72 and 74 and the shafts for the upper idler rolls 96 and 98 of the belts 66 and 68 are mounted and supported on bearings (not shown in detail) carried on the finger flanges of the respective upright guides 112 and 122. The guide 122 is provided with a pair of support sleeves 132 similar to the sleeves 128 and in sliding engagement on the support rods 126 so that the belt 68 may be adjusted in the direction of the arrows "B" in FIGS. 1 and 2 toward and away from the belt 66. The upright support 130 is detachably connected to the top wall 108 of the knife housing 110 by means of a pair of removable pins 134 having pull rings at one end and the pins are adapted to project through aligned openings in the lower end of the upright support 130 and a pair of upstanding lugs 136 secured to the knife housing top wall 108 (FIG. 2). By removing both sets of pins 114 and 134, the entire feeder 34 can be dismounted from the knife housing 110 of the slicer 37 and if only the pins 134 are removed, the structure of the feeder can be pivoted in a counterclockwise direction (in the sense of FIG. 2) about the axis pins 114 to expose the lower or discharge end of the feeder and expose the removable orifice ring 42.

Orifice rings having various different shapes and sizes of restricted orifices are insertable in an opening in the housing top wall 108 offset outwardly of the axis of the drive shaft 38 of the knife as best shown in FIG. 2. Each time that loaves of a different cross-section are sliced, an appropriately shaped orifice ring is inserted and locked in place in the opening in the knife housing top wall 108.

Adjustment of the position of the endless belt 68 toward or away from the belt 66 in the directions indicated by the arrows "B" to accommodate different types of product is set and controlled by a hand wheel 138 mounted on the end of a threaded shaft 140. The shaft, which extends through an internally threaded collar 142 provided on the upright 130, is coupled at its inner end to the back side of the guide member 122 via a coupling 144. Turning of the hand wheel 138 positively adjusts and holds spacing between the belts 66 and 68 providing a serpentine path of selected width for the loaves 32 fed into the cutting path of the knife 36.

Figure 1:
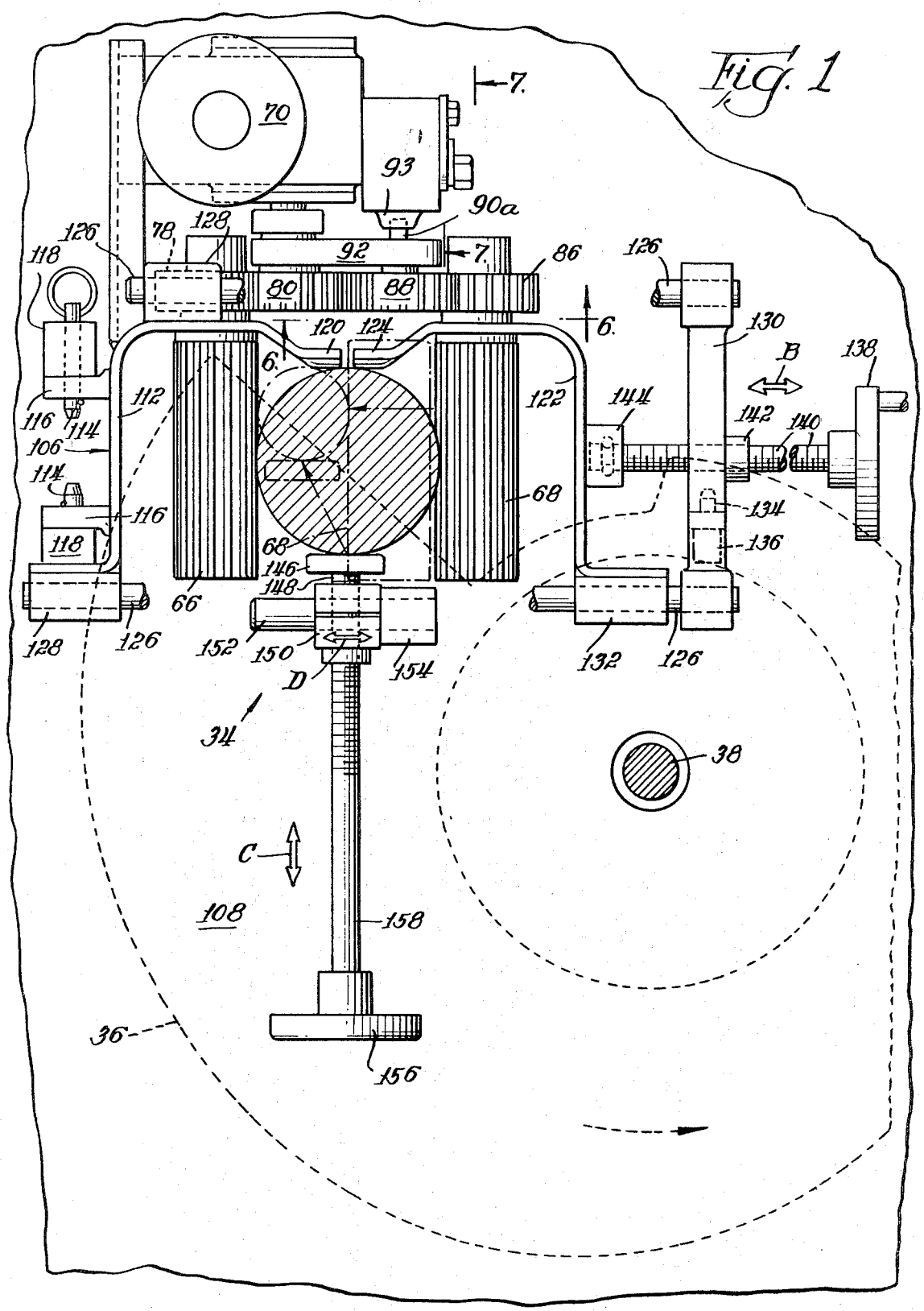
FIG. 1 is a top plan view of a preferred embodiment of the new and improved feeding apparatus of the present invention.

Referring to FIG. 1, the feeder 34 is provided with an elongated upright guide bar 146 spaced opposite the cooperating guide fingers 120 and 124 and adjustably positioned to move toward and away from the guide fingers as well as toward and away from the faces of the belts 66 and 68 as indicated in the dotted lines of FIG. 1. The guide bar 146 is provided with a pair of support pins 148 extending outwardly and slidably mounted in openings provided in separate upright member 150. The upright member 150 in turn is slidably supported on a pair of rods 152 extending outwardly from a relatively fixed member 154. A hand wheel 156 on the outer end of a threaded adjustment rod 158 is provided for adjusting (in the direction of the arrows "C") and setting the position of the guide bar 146 (FIG. 1) relative to the opposite guide fingers 120 and 124. The inner end of the adjustment rod 158 is rotatively coupled to the guide bar and the rod extends through an internally threaded collar attached to the member 150 to provide in and out position adjustment of the guide bar relative to the support member 150. The support 150 is slidable on the rods 152 and is movable in the direction of the arrows "D." Clamping means (not shown) is provided for securing the member 150 in a selected position on the rods 152 after an adjustment is made and a position is selected.

The elongated loaves 32 of food product are positively fed at a selected substantially constant rate along the feed path by the driving engagement of the driving runs of the cleated feed belts 66 and 68 and the product is compressed and bent in reverse direction as it moves down the serpentine path defined by the belts and their backing members 102. Each loaf is positively gripped by the belts and fed into the path of the cutting knife 36 so that little if any slippage occurs. The loaves are retained between the feed belts by the cooperating guide fingers 120 and 124 on one side and the adjustable guide bar 146 on the opposite side.

Although the present invention has been described with reference to a single illustrative embodiment thereof, it should be understood that numerous other modifications and embodiments can be devised by those skilled in the art which will fall within the spirit and scope of the principles of this invention.

What is claimed and desired to be secured by Letters Patent of the United States is:

1. Apparatus for feeding an elongated mass of substantially uniform transverse dimension longitudinally along a feed path intersecting the cutting path of a rotary knife, said apparatus comprising a pair of spaced apart endless belts having driving runs disposed on opposite sides of said feed path for driving engagement with said mass, a pair of undulated surfaces positioned to hold said driving runs in driving engagement with a mass being fed along said feed path, a pair of lateral guides for said mass normal to said undulated surfaces, one of said lateral guides comprises a plurality of intermeshing fingers spaced apart and transverse to the longitudinal axis of said loaf, said fingers supported relative to said undulated guide surfaces with alternate ones movable toward and away from the others, and means for moving said belts along said driving runs in a common direction.

2. The apparatus of claim 1 wherein at least one of said undulated guide surfaces is mounted for pivotal movement between a first position extending generally normal to said cutting path and a second position angularly disposed to said first position for permitting open access to one end of said apparatus normally adjacent to said cutting path when in said first position.

* * * * *